United States Patent
Sampson

Patent Number: 6,081,720
Date of Patent: Jun. 27, 2000

[54] METHOD AND APPARATUS FOR ALLOCATING SHARED COMMUNICATION CHANNELS

[75] Inventor: Nicholas Sampson, Garrett Park, Md.

[73] Assignee: Hughes Electronics Corporation, El Segundo, Calif.

[21] Appl. No.: 08/672,357

[22] Filed: Jun. 28, 1996

[51] Int. Cl.[7] .................................................. H04Q 7/20
[52] U.S. Cl. .............................. 455/450; 455/460
[58] Field of Search .................................... 455/466, 426, 455/450, 454, 62, 422, 405, 115, 455, 453

[56] References Cited

U.S. PATENT DOCUMENTS

| | | | |
|---|---|---|---|
| 4,905,302 | 2/1990 | Childress et al. | 455/512 |
| 4,939,746 | 7/1990 | Childress | 455/512 |
| 5,125,102 | 6/1992 | Childress et al. | 455/520 |
| 5,404,392 | 4/1995 | Miller et al. | 455/422 |
| 5,423,057 | 6/1995 | Kuznicki et al. | 455/343 |
| 5,442,809 | 8/1995 | Diaz et al. | 455/511 |
| 5,457,680 | 10/1995 | Kamm et al. | 455/466 |
| 5,577,168 | 11/1996 | Haas et al. | 455/443 |
| 5,633,915 | 5/1997 | Yang et al. | 455/453 |
| 5,721,762 | 2/1998 | Sood | 455/466 |
| 5,896,573 | 4/1999 | Yang et al. | 455/453 |

*Primary Examiner*—Salvatore Cangialosi
*Attorney, Agent, or Firm*—John T. Whelan; Michael W. Sales

[57] ABSTRACT

A method and apparatus for allocating shared communication channels between a voice transceiver segment and a data/CDPD transceiver segment of a cellular radio communication system incorporating a CDPD overlay. A LAN provides a communication path for transmitting channel allocation messages directly between the voice transceiver segment and the data/CDPD transceiver segment. The channel allocation messages function to distribute shared channels according to a predetermined protocol that includes a priority to either the voice or data/CDPD segment.

20 Claims, 5 Drawing Sheets

FIGURE 3A

INITIALIZATION

70

AMCM 68 and CCAM 66 register with "hook function" for "channel allocation" frames (or messages).

↓

CCAM 66 initiates the shared channel mode by broadcasting an "initialization" frame of the type "channel allocation" on the LAN 34.

↓

The AMCM 68 receives and processes the initialization message, then responds directly to the source of the message (CCAM 66) with a "channel idle" message that lists each shared channel that is voice idle.

↓

CCAM 66 processes the channel idle messages it receives and marks each corresponding channel in its list as "voice idle". CCAM 66 can now open channels for data or CDPD assignment.

VOICE CHANNEL ACTIVATION

↓

Voice transceiver 30 broadcasts a "channel busy" message on the LAN 34 whenever a channel is activated for voice transmission/reception. The voice transceiver 30 then starts a timer and waits for a "channel idle" acknowledgement of that message.

↓ To Figure 3B

METHOD AND APPARATUS FOR ALLOCATING SHARED COMMUNICATION CHANNELS

BACKGROUND OF THE INVENTION

Wireless cellular telephony systems have enjoyed great popularity in recent years. At various times, the channels that carry voice communications in a cellular telephony system may be idle (i.e., no signal transmission over the channel at a particular time). These unused or idle voice channels may be utilized for other communications such as data communication. In particular, an overlay communication system utilizing unused or idle voice channels for digital data communication is desirable. Cellular Digital Packet Data (CDPD) is such an overlay system which provides mobile datagram service utilizing the idle voice channels of an existing cellular telephony infrastructure.

A consortium of cellular communication carriers prepared and released in 1993 a specification entitled "Cellular Digital Packet Data System Specification." The specification defines a protocol to be used by the industry when transmitting and receiving CDPD data messages over an existing cellular communication infrastructure. The protocol specifies that CDPD shall be transmitted at a symbol rate that is an integer multiple of 19.2 KHz. The protocol also specifies that CDPD are transmitted in bursts, each having a preamble formed by a dotting sequence of 38 bits followed by a synchronization pattern of 22 bits. Following the preamble is a data sequence having n multiples of 385 bits of data.

Like standard cellular voice transmissions, the CDPD overlay system transmits data from a plurality of remote subscriber units to base stations which relay the data to external fixed end systems or other CDPD networks. Data communication from the remote subscriber units to the base stations is wireless, and the subscriber units may be movable or stationary.

In a typical voice/CDPD cellular radiotelephone system, some of the communication channels may be dedicated to voice, other communication channels may be dedicated to CDPD, while still other communication channels may be shared. For shared communication channels, there is a need to allocate them between voice communication and data communication. Typically, special detection devices are provided that monitor the voice activity on shared channels in order to make channel allocation decisions. Such detection devices, often known as "sniffer" circuits, are "active" hardware-based devices that add complexity and increase maintenance requirements.

Accordingly, there is a need for a method and apparatus that allocates shared communication channels in a manner that is simple, efficient and easily maintained.

SUMMARY OF THE INVENTION

The present invention provides a method and apparatus for allocating shared communication channels. The invention is specifically applicable to wireless cellular telephony systems having CDPD transmission capabilities. In such systems, some of the available communication channels are typically shared between analog voice and digital data (CDPD) transmissions. The present invention may be utilized to carry out a desired priority in allocating the shared communication channels. Specifically, the present invention monitors channel activity by establishing efficient and direct two-way communication of channel status messages between the voice/CDPD system's voice-based transceiver segment and data-based transceiver segment. The channel status messages can include information such as whether the particular transceiver segment is active, the idle channels, the busy channels, the higher-priority transceiver's desire for a channel that is currently being used by the lower-priority transceiver, and other information.

In one aspect of the present invention, there is provided, in a voice/CDPD cellular communication system having shared communication channels, an apparatus comprising a first transceiver segment, a second transceiver segment, and a communication medium coupling the first transceiver segment and the second transceiver segment. The communication medium carries channel status messages from the first transceiver to the second transceiver and vice versa. The first transceiver segment and the second transceiver segment utilize the channel status messages to determine how the shared communication channels are allocated between the first transceiver segment and the second transceiver segment.

In another aspect of the invention, the above-referenced first transceiver segment receives priority over the second transceiver segment when the shared communication channels are being allocated.

In another aspect of the invention, the above-referenced channel status messages include a heart-beat message indicating that the first transceiver segment is active, a channel-busy message indicating that the first transceiver segment is utilizing a particular one of the shared communication channels, and a channel-free message indicating that the first transceiver segment is not utilizing a particular one of the shared communication channels.

In still another aspect of the present invention, there is provided a method of allocating shared communication channels between a first transceiver segment and a second transceiver segment, the steps including providing a communication medium between the first transceiver segment and the second transceiver segment, and transmitting channel status messages on the communication medium between the first transceiver segment and the second transceiver segment. The first transceiver segment and second transceiver segment utilize the channel status messages to determine how the shared communication channels are allocated between the first transceiver segment and the second transceiver segment.

In another aspect of the present invention there is provided the above-referenced method further including the step of giving the first transceiver segment priority over the second transceiver segment when allocating the shared communication channels.

In another aspect of the present invention, there is provided the above-referenced method wherein the channel status messages include a heart-beat message indicating that the first transceiver segment is active, a channel-busy message indicating that the first transceiver segment is utilizing a particular one of the shared communication channels, and a channel-free message indicating that the first transceiver segment is not utilizing a particular one of the shared communication channels.

Accordingly, the present invention is capable of providing several advantages. For example, the method and apparatus of the present invention eliminates the need for special detection devices that monitor the voice activity on shared communication channels in order to make channel allocation decisions. Such detection devices, often known as "sniffer" circuits, are "active" hardware-based devices that add complexity and increase maintenance requirements. In contrast, the present invention achieves channel allocation using channel status protocols that are preferably generated by the voice and data segments themselves, and communicated directly between the voice and data segments in a simple and efficient manner. The channel status protocols of the present invention are also "passive" and therefore easier to maintain than active sniffer-based channel allocation systems.

The invention itself, together with further objects and attendant advantages, will best be understood by reference to the following detailed description, taken in conjunction with the accompanying drawings.

BRIEF DESCRIPTION OF THE DRAWINGS

FIGS. 3A, 3B and 3C are a flow diagram illustrating the four states of a messaging protocol that can be implemented by the base station shown in FIG. 2. The messaging protocol represents one embodiment of the method of the present invention.

DETAILED DESCRIPTION OF THE DRAWINGS

The present invention provides a method and apparatus for allocating shared communication channels. The invention may be incorporated into an otherwise conventional wireless cellular telephony systems having cellular digital packet data (CDPD) transmission capabilities. In such systems, certain communication channels are typically shared between analog voice and digital data (CDPD) transmission segments. The present invention may be utilized to carry out a desired priority in allocating the shared communication channels. Specifically, the present invention passively monitors channel activity by establishing efficient and direct two-way communication of channel status messages between the voice-based transceiver segment and the data-based transceiver segment. The channel status messages can include information such as whether the particular transceiver segment is active, the idle channels, the busy channels, the higher-priority transceiver's desire for a channel that is currently being used by the lower-priority transceiver, and other information.

Figure 1:
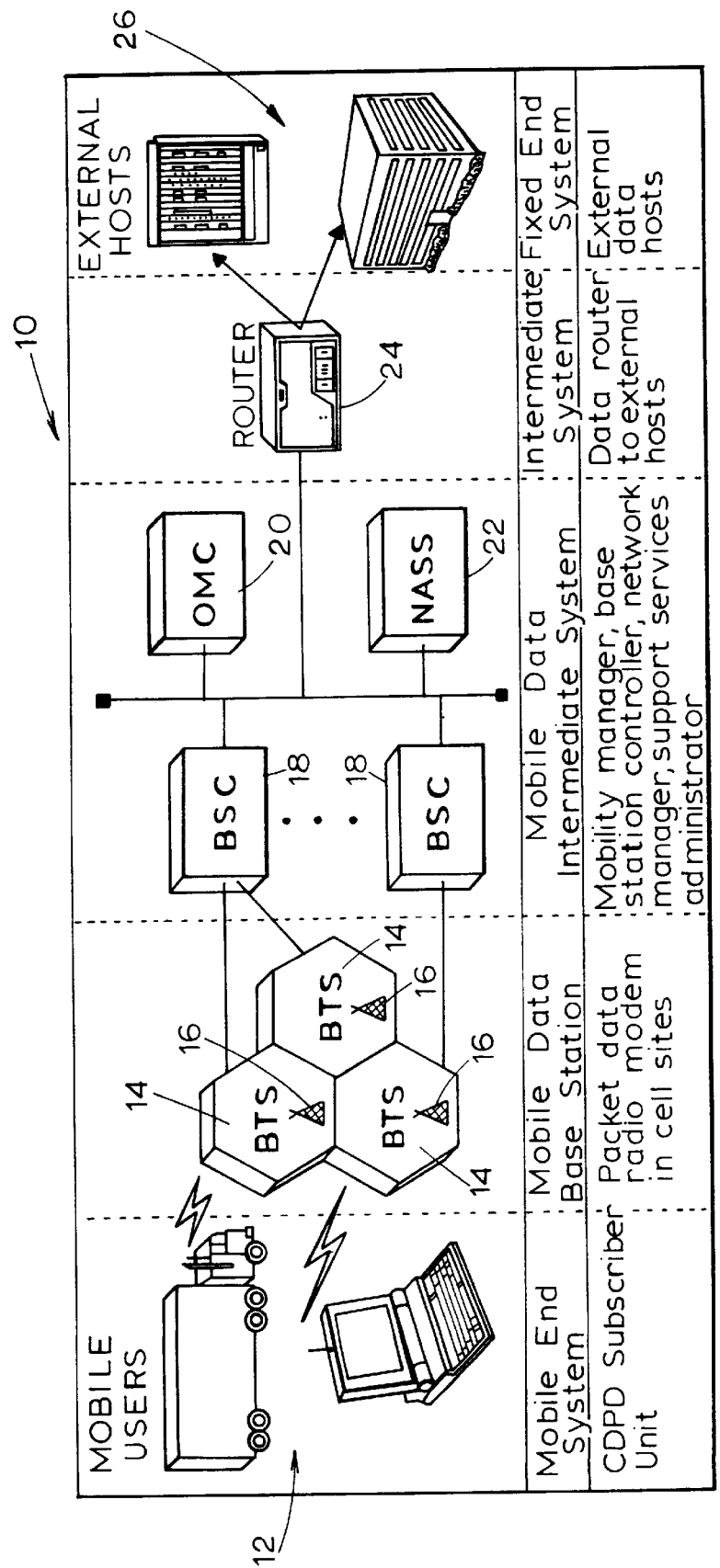
FIG. 1 is a general block diagram of a cellular radio communication system having a CDPD overlay and capable of incorporating the method and apparatus of the present invention.

FIG. 1 is a general block diagram of a cellular radio communication system 10 incorporating a CDPD overlay. The following is a simplified description of the system 10, intended for illustrative purposes only, and focussing primarily on the CDPD aspects of the system 10. In general, the voice/data cellular radiotelephone communication system 10 includes a plurality of remote, mobile CDPD subscriber units 12 and conventional voice-based, mobile radiotelephone units (not shown). Geographical areas are divided into cells 14, and within each cell 14 is a base station (BTS) 16 that transmits and receives signals from the subscriber units 12. The base stations 16 are wire-connected to base station controllers (BSC) 18, mobility managers (OMC) 20, and network manager support services administrator (NASS) 22. The BSC 18, OMC 20 and NASS 22 are wire-connected to a router 24 and external hosts 26. The remote subscriber units 12, which may be mobile or stationary, communicate with the external hosts 26, or with other remote subscriber units 12, through the base stations 16.

As illustrated in FIG. 1, the complete CDPD architecture consists of five logical elements—a Mobile End System (M-ES), a Mobile Data Base Station (MDBS), a Mobile Data Intermediate System (MD-IS), an Intermediate System (IS), and a Fixed End System (F-ES). In general, the M-ES includes the mobile CDPD subscriber units 12 and conventional mobile radiotelephone units (not shown), which operate as wireless communication devices. Their physical locations may change with time, but continuous network access is maintained. The MDBS includes a plurality of voice and/or data base stations (BTS) 16 which act as a packet data radio modem at cell cite locations serving as a relay between the M-ES and its serving MD-IS. The MD-IS includes the BSC 18, OMC 20, and NASS 20. The MD-IS performs routing functions to support mobility by the M-ES, based on knowledge of location of the M-ES. The IS is a standard data router 24 that supports connection-less network service, and interfaces the voice/data system 10 to external fixed end systems or other CDPD networks. The F-ES includes external data application systems, or host computers 26 whose location is fixed. The F-ES is interfaced to an IS by traditional existing network routing.

Figure 2:
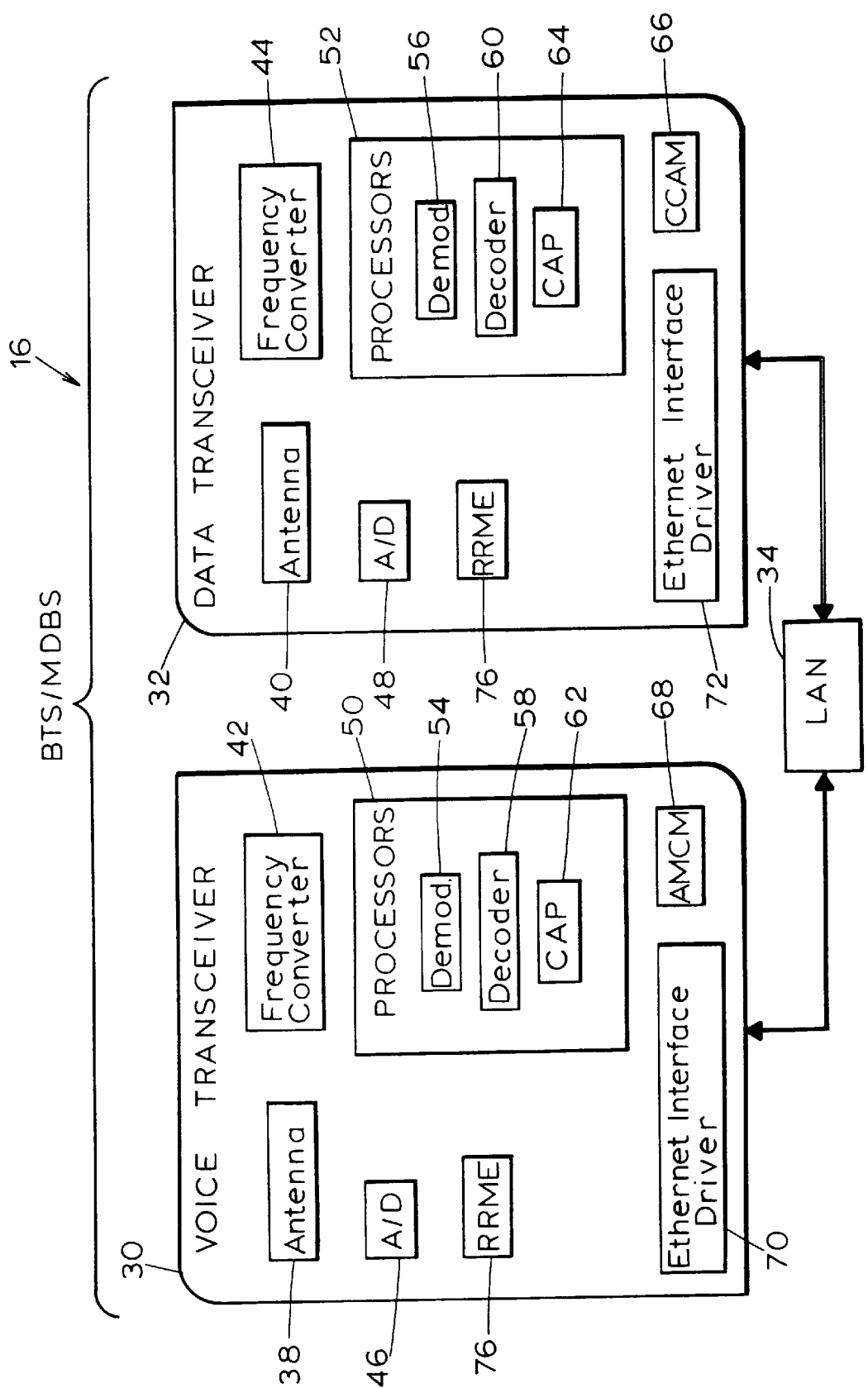
FIG. 2 is a more detailed block diagram of a voice-BTS and data-MDBS, which may be used in the system of FIG. 1, and which represents one embodiment of the apparatus of the present invention.

FIG. 2 illustrates a more detailed block diagram of a particular BTS/MDBS combination 16', which is capable of operating in the voice/data system 10 shown in FIG. 1, and which represents one embodiment of the present invention. The BTS/MDBS 16' includes at least one voice-based transceiver segment (i.e., voice-based BTS) 30 in communication with at least one data-based transceiver segment (i.e., data-based MDBS) 32 via a convention local area network (LAN) 34. Preferably, the voice-based base stations of the voice/data system 10 are already in communication with one another via a conventional LAN using conventional ethernet link layer connection technology. Accordingly the LAN 34 shown in FIG. 2 can be conveniently implemented by extending the existing voice-based BTS LAN to include connection to and communication with the data-based transceiver segment 32.

The voice transceiver segment 30 and data transceiver segment 32 are virtually identical pieces of equipment, but are used to provide different services over the same medium (air). Preferably, the voice transceiver segment 30 includes at least sufficient hardware components to process frequency modulated analog voice and/or TDMA modulated digital voice, while the data transceiver segment 32 has at least sufficient hardware components to process GMSK modulated CDPD data. The voice transceiver segment 30 and data transceiver segment 32 each may include, respectively, at least one antenna 38, 40 a frequency converter 42, 44 an analog/digital converter 46, 48 (optional for voice transmissions) and processors 50, 52. The processors 50, 52 may each include, respectively, a demodulator 54, 56 a decoder 58, 60, and a channel access processor 62, 64. The antenna 38, 40 receives signals transmitted by the remote subscriber unit 12, and transmits signals from the transceiver segments, 30 or 32, to remote subscriber units 12. For received signals, the frequency converters 42, 44 strip away the carrier frequency, and the analog/digital converters 46, 48 convert the resulting signal to digital. For signals that are to be transmitted, the analog/digital converters 46, 48 and the frequency converters 42, 44 perform the opposite operations, converting the digital bit stream to analog, then converting the analog signal to the required RF frequency for transmission.

The analog/digital converters 46, 48 are coupled to the processors 50, 52 which perform the bulk of the modulation and demodulation required for transmitted and received signals. The processors 50, 52 also perform functions that are common to the frequency converters 42, 44 and analog/digital converters 46, 48 including for example handshaking, diagnostics, and slot interrupts. The channel access processors 62, 64 are modules that control physical access to the communication channels.

Each transceiver 30 and 32 includes programming sufficient to allow LAN communication using a conventional ethernet link layer network architecture and conventional ethernet interface drivers 52, 54. The transceivers 30, 32 also include programming modules that perform channel allocation management, for example, the analog mobile control manager (AMCM) 56 of the voice transceiver segment 30 and the CDPD channel allocation manager (CCAM) 58 of the data transceiver 32 segment.

Figure 3B:
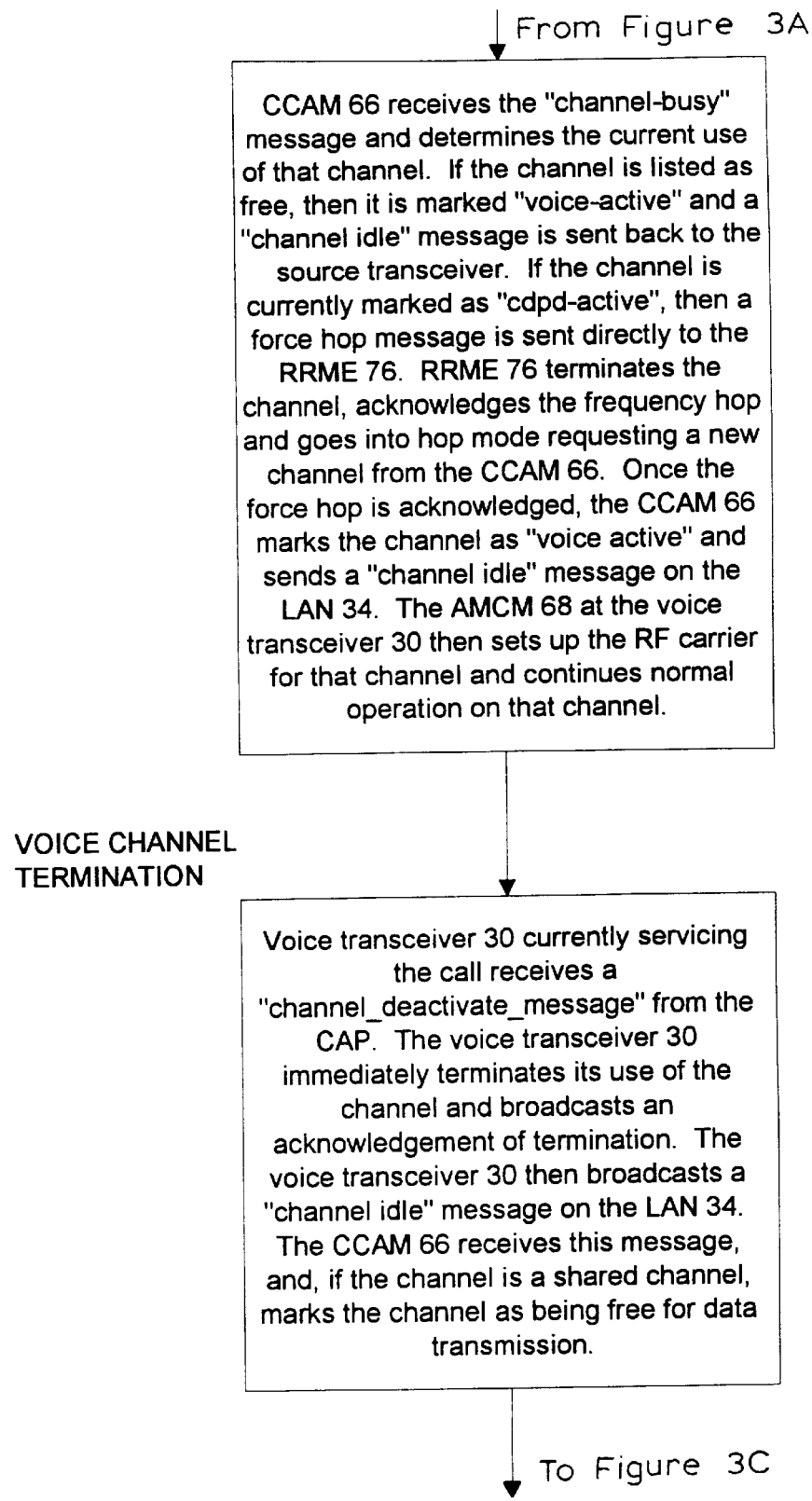
Figure 3C:
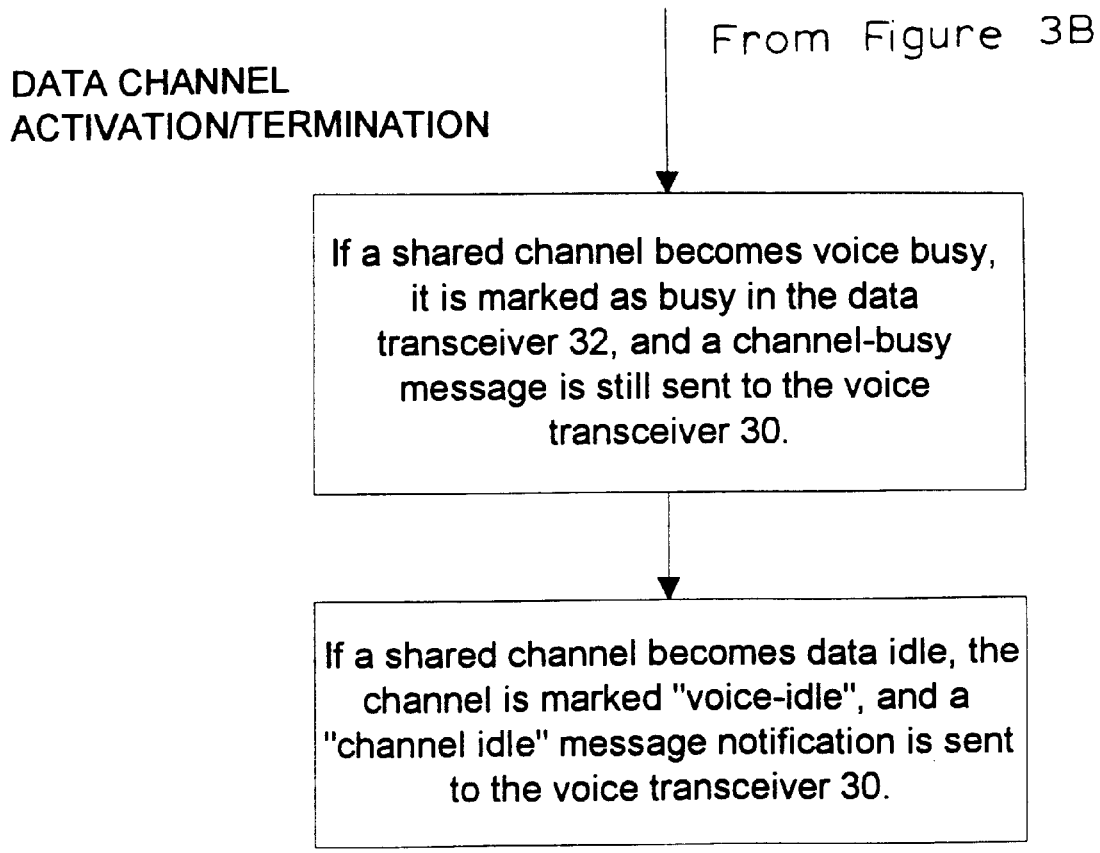

Turning now to FIGS. 3A, 3B and 3C, there is illustrated a flow diagram 70 of a messaging protocol that is carried out via ethernet messages transmitted from the voice transceiver segment 30 to the data transceiver segment 32, and vice versa, using the ethernet LAN 34. The messaging protocol represents one embodiment of the method of the present invention. The ethernet messages that form the disclosed embodiment of the messaging protocol are marked as special "channel-allocation" messages such that they are only of interest to voice transceivers 30 and data transceivers 32 on the LAN 34.

The voice transceiver 30 and data transceiver 32 are placed in a shared channels mode by an initialization message from the data transceiver 32. In the shared channel mode, the voice transceiver 30 broadcasts on the LAN 34 messages about channel use. The voice transceiver 30 does not typically wait for acknowledgement of these messages from the data transceiver 32 unless the broadcast message is a "channel busy" message. To improve efficiency, the interface drivers 52, 54 encode messages directly into ethernet frames at the data link layer, thus bypassing other higher level protocols above the data link layer. This makes the processing and interpretation of messages by the voice and data segments very efficient because the additional overhead of propagating up more network layers and stripping out other network information is avoided. The ethernet drivers 52, 54 handle demultiplexing of messages, based on message type, through a conventional ethernet hook function. The ethernet hook function provides a hook for message handlers on a LAN to register their interest in certain types of messages.

The data transceiver 32 is aware of the existence of the voice transceiver 30 through heart-beat messages sent by the voice transceiver 30. The heart-beat messages are preferably a known message composition, sent at regular intervals over the LAN connection indicating that the voice transceiver 30 is active. The data transceiver 32 can use the heart-beat messages to maintain information about the health of the interconnection and the voice transceiver 30. For example, if the data transceiver 32 does not receive either regular channel-use or heart-beat messages from the voice transceiver 30, the data transceiver 32, as a proactive failure management strategy, disables the sharing of channels.

The voice transceiver 30 broadcasts information in ethernet frames indicating channel allocation/deallocation on the voice side. The data transceiver 32 registers with the ethernet hook function for messages of the "channel-allocation" type. As soon as a message of that type arrives on LAN 34, the ethernet driver 54 calls the registered procedure for handling "channel-allocation" messages. For a data transceiver carrying CDPD data, the programming module responsible for channel management is the CDPD channel allocation manager (CCAM) 66. In the voice transceiver 30, the programming module responsible for channel management is the analog mobile control manager (AMCM) 56.

Referring again to FIGS. 3A, 3B and 3C, the disclosed messaging protocol can be divided into four general states—initialization, voice channel activation, voice channel termination, and data channel activation/termination. In the initialization state, the AMCM 68 and the CCAM 66 register a local function with their respective ethernet driver's (70, 72) hook function for ethernet frames of the type "channel allocation". This local function is preferably a conventional ethernet procedural handler set up for messages of the type "channel allocation". The CCAM 66 broadcasts an ethernet frame of the type "channel allocation" on the LAN 34. The data portion of this message identifies it as an initialization of the shared channel mode between the voice transceiver 30 and the data transceiver 32. All voice and data transceivers 30, 32 on the LAN 34 receive the initialization message. The initialization message is processed by the AMCM 68 which responds directly to the source of the message (CCAM 66) with a "channel idle" message that lists each shared channel that is voice idle. The CCAM 66 processes the channel idle messages it receives and marks each corresponding channel in its list as "voice-idle". All other shared channels in the CDPD system's channel pool are assumed to be busy unless notified otherwise. At this point, the CCAM 66 can open channels for data or CDPD assignment.

In the voice-channel-activation stage, whenever a channel is activated for voice transmission/reception, the voice transceiver 30 broadcasts a "channels busy" message over the LAN 34. The voice transceiver 30 then starts and waits for a "channel idle" acknowledgement for that message. Upon receiving the "channel-busy" message, the CCAM 66 on the data transceiver 32 queries its table of shared channels for the current use of that channel. If the channel is listed as free, then it is marked "voice-active" and a "channel-idle" message is sent back to the source transceiver. If the channel is currently marked as "cdpd-active", then a force hop message is sent directly to the Radio Resource Management Entity (RRME) 76 at the data transceiver 32 that is currently using the channel. In a conventional manner, the RRME 76 terminates the channel, acknowledges the frequency hop and goes into hop mode requesting a new channel from the CCAM 66. Once the force hop is acknowledged, the CCAM 66 at the data transceiver 32 marks the channel as "voice active" and sends a "channel idle" message. The AMCM 68 at the voice transceiver 30 then sets up the RF carrier for that channel and continues normal operation on that channel.

Turning now to the third state illustrated in FIG. 3B, in conducting a voice channel termination, the voice transceiver 30 currently servicing the call receives a "channel_deactivate_message" from the CAP. The voice transceiver 30 immediately terminates use of the channel and responds back to the CAP with an acknowledgement of termination. The voice transceiver 30 then composes a "channel idle" message and broadcasts it on the LAN 34. The CCAM 66 on the data transceiver 32 receives this message, and, if the channel is a shared channel, marks the channel as free to be used by CDPD.

Turning now to the fourth state illustrated in FIG. 3C, in conducting a data or CDPD channel activation/termination, when a shared channel becomes busy, it is marked as busy in the data transceiver 32. However, a channel-busy message should still be sent to the voice transceiver 30. This is because the voice transceiver 30 senses data/CDPD traffic on the channel as noise and removes that particular channel from its list of available channels, thus preventing use of that channel altogether, first by the voice transceiver 30, and eventually by the data/CDPD transceiver 32. The "channel busy" message is sent to prevent this from happening. The same applies to data/CDPD channel termination. The channel is just marked "voice-idle", and a "channel idle" message notification is sent to the voice transceiver 30.

It should be noted that the voice transceiver 30 of the present invention is intended to be capable of functioning independently of the data/CDPD transceiver 32 for non-shared channels. However, for shared channels, for every channel that the voice transceiver wants to use, it waits for an acknowledgement, and has to wait a full time-out period before proceeding with normal operation. However, to ensure that there is no intrusion from the data/CDPD system, and to ensure that the voice channel quality is not significantly compromised, if an acknowledgement is not received, the channel is not used by the system. The voice transceiver 30 then tries to allocate another channel. Also, if no heart-beat messages are broadcast from the voice transceiver 30, the data/CDPD transceiver 32 shuts down the use of shared channels after a specified time interval. If there occurs a break in the physical interconnection (LAN 34) resulting in broadcast messages not being received by the data/CDPD transceiver 32, the data/CDPD transceiver 32 shuts down the use of shared channels after a specified period of time.

It should be further noted that if the ethernet frames are garbled or lost, then the transmitting system is not aware of the loss. If the time for acknowledgement expires, then it retransmits the frame. The only situation where a message loss can seriously impact the system is the "channel-busy" message from the voice transceiver 30. If this message is lost, then the potential for channel intrusion increases. Hence the voice transceiver 30 keeps retransmitting this message at regular intervals until an acknowledgement is received from the data/CDPD transceiver segment 32. Also, if one data/CDPD transceiver 32 switches over to another data/CDPD transceiver, the processor 50 or 52 transfers the necessary channel allocation information to the new data/CDPD transceiver. If one voice transceiver segment 30 switches over to another voice transceiver segment, this should not cause any adverse problems, because, in the presently described embodiment, the voice transceiver segment 30 does not store channel sharing information in the data/CDPD segment 32.

Accordingly, it can be seen from the foregoing detailed description that the present invention is capable of providing several advantages. For example, the method and apparatus of the present invention eliminates the need for special detection devices to monitor the voice activity on shared channels in order to make channel allocation decisions. Such detection devices, often known as "sniffer" circuits, are "active" hardware-based devices that add complexity and increase maintenance requirements. In contrast, the present invention achieves channel allocation using channel status protocols that are simple and efficient. The channel status protocols of the present invention are also "passive" and therefore easier to maintain than active sniffer-based systems.

Of course, it should be understood that a range of changes and modifications can be made to the preferred embodiment described above. For example, rather than having two physically separate voice and data/CDPD transceivers, these units could be integrated into a single unit that is a combined voice/data transceiver. Additionally, the use of the term transceiver or transceiver-segment is not intended to limit the invention by including all of the detailed operations of the transceiver segments described herein. The particular details of how the transceivers or transceiver segments functions may be modified, increased or decreased, as long as it provides the basic ability to generate, transmit and receive channel-use and/or heart-beat messages. For example general channel management functions, such as radio resource management, may or may not be provided on the transceiver or transceiver segment. It is therefore intended that the foregoing detailed description be regarded as illustrative rather than limiting and that it be understood that it is the following claims, including all equivalents, which are intended to define the scope of this invention.

I claim:

1. A method of allocating shared communication channels between a first transceiver segment capable of making channel assignments and a second transceiver segment capable of making channel assignments, the steps comprising:

providing a communication medium between said first transceiver segment and said second transceiver segment; and transmitting channel status messages on said communication medium between said first transceiver segment and said second transceiver segment;

said first transceiver segment and second transceiver segment utilizing said channel status messages to determine how the shared communication channels are allocated between said first transceiver segment and said second transceiver segment.

2. The method of claim 1 further comprising the step of giving said first transceiver segment priority over said second transceiver segment when allocating said shared communication channels.

3. The method of claim 1 wherein said channel status messages comprise a heart-beat message indicating that the first transceiver segment is active.

4. The method of claim 1 wherein said channel status messages comprise a channel-busy message indicating that said first transceiver segment is utilizing a particular one of said shared communication channels.

5. The method of claim 1 wherein said channel status messages comprise a channel-free message indicating that said first transceiver segment is not utilizing a particular one of said shared communication channels.

6. A method of allocating shared communication channels between a first transceiver segment capable of making channel assignments and a second transceiver segment capable of making channel assignments, the steps comprising:

providing a communication medium between said first transceiver segment and said second transceiver segment;

transmitting channel status messages on said communication medium between said first transceiver segment and said second transceiver segment;

said channel status messages comprising a heart-beat message indicating that the first transceiver segment is active, a channel-busy message indicating that said first transceiver segment is utilizing a particular one of said shared communication channels, and a channel-free message indicating that said first transceiver segment is not utilizing a particular one of said shared communication channels;

said first transceiver segment and second transceiver segment utilizing said channel status messages to determine how the shared communication channels are allocated between said first transceiver segment and said second transceiver segment, said first transceiver segment receiving priority over said second transceiver segment when said shared communication channels are allocated.

7. The methods of claim 1, 2, 3, 4, 5 or 6, wherein:

said first transceiver segment comprises a voice-based transceiver; and said second transceiver segment comprises a data-based transceiver.

8. The method of claim 6 wherein:

said first transceiver segment comprises a voice-based telephony transceiver; and said second transceiver segment comprises a CDPD transceiver.

9. In a cellular communication system capable of transmitting voice-based telephony information and CDPD information on shared communication channels, an apparatus comprising:

a first transceiver segment capable of making channel assignments;

a second transceiver segment capable of making channel assignments;

a communication medium coupling said first transceiver segment and said second transceiver segment and carrying channel status messages between said first transceiver segment and said second transceiver segment;

said first transceiver segment and second transceiver segment utilizing said channel status messages to determine how the shared communication channels are allocated between said first transceiver segment and said second transceiver segment.

10. The apparatus of claim 9 wherein said first transceiver segment is given priority over said second transceiver segment when said shared communication channels are allocated.

11. The apparatus of claim 9 wherein said channel status messages comprise a heart-beat message indicating that the first transceiver segment is active.

12. The apparatus of claim 9 wherein said channel status messages comprise a channel-busy message indicating that said first transceiver segment is utilizing a particular one of said shared communication channels.

13. The apparatus of claim 9 wherein said channel status messages comprise a channel-free message indicating that said first transceiver segment is not utilizing a particular one of said shared communication channels.

14. In a cellular communication system capable of transmitting voice-based telephony information and CDPD information on shared communication channels, an apparatus comprising:

a first transceiver segment capable of making channel assignments;

a second transceiver segment capable of making channel assignments;

a communication medium coupling said first transceiver segment and said second transceiver segment and carrying channel status messages between said first transceiver segment and said second transceiver segment;

said channel status messages comprising a heart-beat message indicating that the first transceiver segment is active, a channel-busy message indicating that said first transceiver segment is utilizing a particular one of said shared communication channels, and a channel-free message indicating that said first transceiver segment is not utilizing a particular one of said shared communication channels;

said first transceiver segment and second transceiver segment utilizing said channel status messages to determine how the shared communication channels are allocated between said first transceiver segment and said second transceiver segment.

15. The apparatus of claims 9, 10, 11, 12, 13 or 14, wherein:

said first transceiver segment comprises a voice-based transceiver; and said second transceiver segment comprises a data-based transceiver.

16. The apparatus of claim 14 wherein:

said first transceiver segment comprises a voice-based telephony transceiver; and said second transceiver segment comprises a CDPD transceiver.

17. A method of allocating shared communication channels between a first transceiver segment capable of making channel assignments and a second transceiver segment capable of making channel assignments, the steps comprising:

providing a communication medium to said first transceiver segment and said second transceiver segment;

each of said first and second transceiver segments generating channel status messages that reflect the channel usage of said each of said first and second transceiver segments;

each of said first and second transceiver segments transmitting channel status messages on said communication medium; and utilizing said channel status messages to determine how the shared communication channels are allocated between said first transceiver segment and said second transceiver segment.

18. The method of claim 17 wherein:

said step of utilizing said channel status messages to determine how the shared communication channels are allocated comprises maintaining a list of shared channels and their status, and further comprises using said channel status messages from said first and second transceivers to update the channel status of shared channels on said list.

19. The method of claim 18 wherein said first transceiver comprises a processor that performs said step of utilizing said channel status messages to determine how the shared communications channels are allocated.

20. The method of claim 17 wherein:

said first transceiver segment is incorporated into a first base station; and said second transceiver segment is incorporated into a second base station.

* * * * *